May 15, 1934.  M. J. KOHLER  1,958,409
NUT BUTTERING MACHINE
Filed Dec. 2, 1932  2 Sheets-Sheet 1

INVENTOR.
Michael J Kohler
BY
Harry C Schroeder
ATTORNEY.

May 15, 1934.   M. J. KOHLER   1,958,409
NUT BUTTERING MACHINE
Filed Dec. 2, 1932    2 Sheets-Sheet 2

INVENTOR.
Michael J. Kohler
BY
Harry Schroeder
ATTORNEY.

Patented May 15, 1934

1,958,409

UNITED STATES PATENT OFFICE 1,958,409

NUT BUTTERING MACHINE

Michael J. Kohler, Oakland, Calif., assignor to The National Nut Company, Oakland, Calif., a corporation of California Application December 2, 1932, Serial No. 645,492

4 Claims. (Cl. 53—4)

This invention is a nut buttering machine, which is specially adapted to the heating and buttering of mixed nuts, and coincidently forms a dispensing device for the nuts.

The main object of the invention is to provide a machine in which mixed nuts are heated to a predetermined temperature and coated with butter, and retained in a heated condition for sale in such condition.

Another object of the invention is to provide a machine of the type outlined which will coincidently heat and agitate a batch of nuts in such manner as to cause butter to completely coat the nuts.

A further object of the invention is to provide a housing for the machine equipped with a display front in which nuts may be attractively displayed, the front of the machine being provided with a transparent panel and a compartment for the nuts.

A still further object of the invention is to provide the machine with means for attracting attention thereto in the form of moving objects.

Other objects and advantages of the invention will become apparent as the following description is read on the drawings forming a part of this specification and in which similar reference characters are used to designate similar parts throughout the several views, of which:

Figure 1:
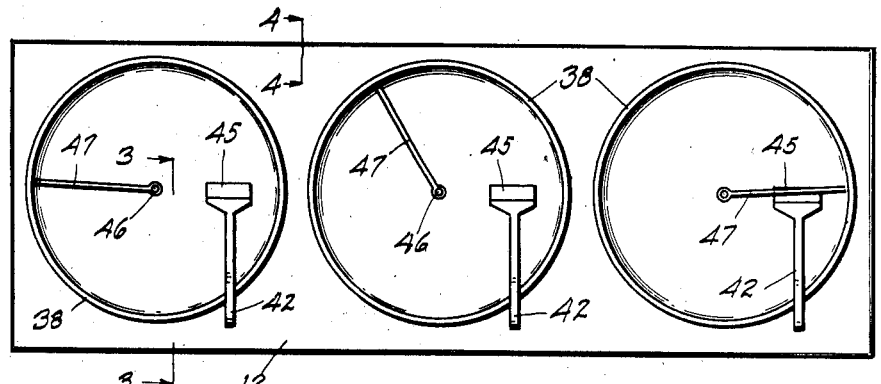
Fig. 1 is a plan view of the invention.
Figure 2:
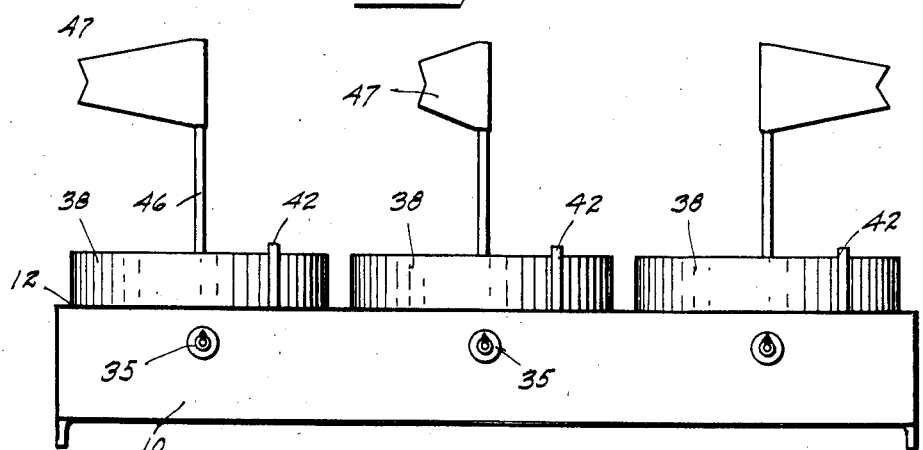
Fig. 2 is a rear elevation of Fig. 1.
Figure 3:
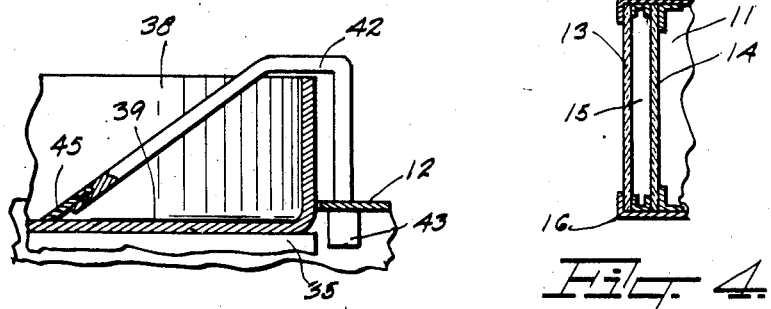
Fig. 3 is an enlarged fragmentary sectional view taken on line 3—3 of Fig. 1.
Figure 4:
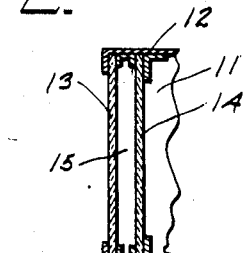
Fig. 4 is an enlarged fragmentary section taken on line 4—4 of Fig. 1.
Figure 5:
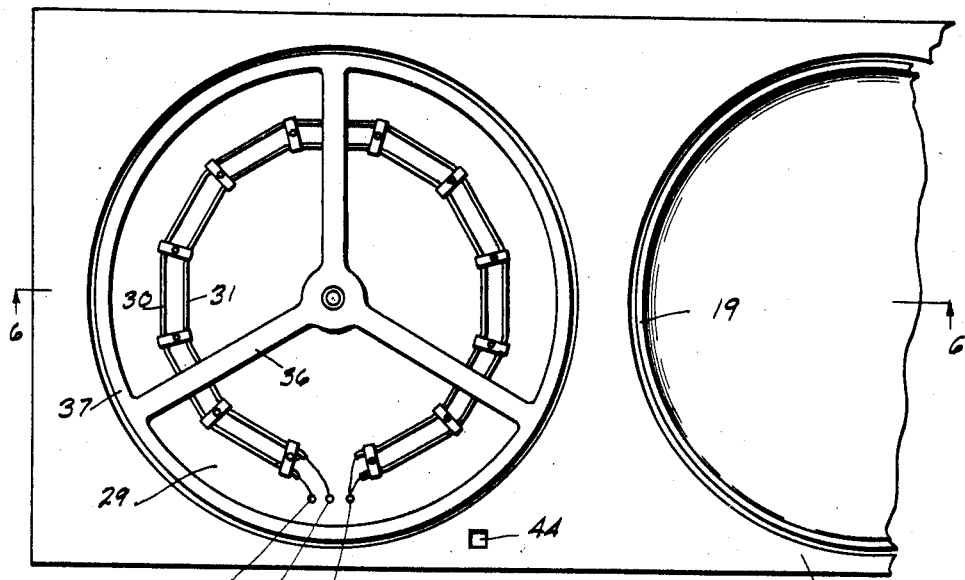
Fig. 5 is an enlarged fragmentary view showing the container removed so as to disclose the spider and the heating unit.
Figure 6:
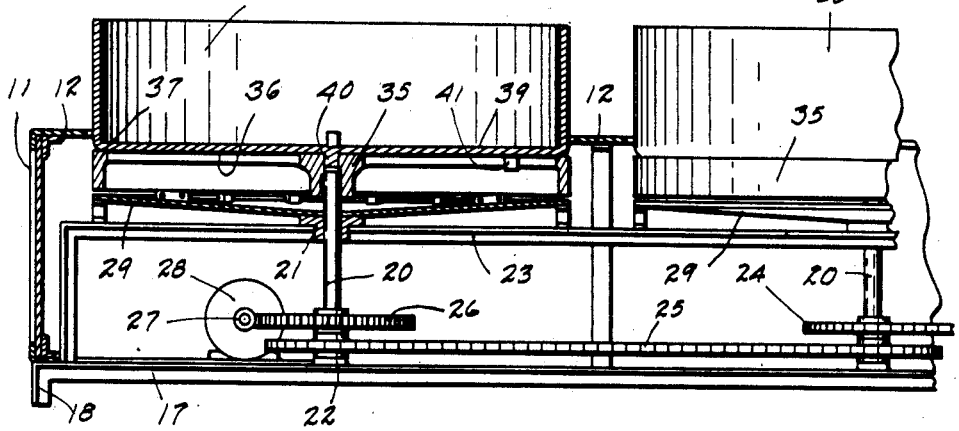
Fig. 6 is a section taken on line 6—6 of Fig. 5.

The invention consists of a housing having a rear wall 10, end walls 11 and a top 12, the front wall consisting of glass or other transparent material 13, and having a wall 14 spaced therefrom to provide a compartment 15, the glass 13 being retained in position by a removable angle bracket 16 which coincidently forms a closure for the bottom of the compartment. The housing is mounted on a base 17 which has integral legs 18, thus permitting the circulation of heat and air through the device.

The top of the cabinet is provided with a series of circular holes 19, at the center of each of which a shaft 20 is rotatably mounted in a vertical plane, suitable bearings 21 and 22 being provided, the bearings being supported by a suitable framing 23. The shafts 20 are coincidently driven through sprockets 24 and cooperating chain 25, so that all of the containers will be rotated coincidently. One of the shafts 20 is provided with a worm gear 26 which cooperates with a worm 27, the worm 27 being mounted to cooperate with the shaft of the motor 28.

Fixedly supported on the framing 23 is a heating unit consisting of a heat-reflector 29 having a concave face directed upwardly. Electrical heating elements 30 and 31 are mounted on the upper side of said reflector, these heating elements being connected at one end to a common terminal 32, the other end of the elements having individual terminals 33 and 34 whereby the heating unit may be controlled as to temperature, four-way switches 35 being provided for each unit, these switches being adapted to connect the terminals 33 and 34 so as to connect the elements 30 and 31 in parallel for one heat, the terminal 32 forming the other connection to the source of electric power, this switch also being adapted to break circuit to the terminal 32 and connect the terminals 33 and 34 to the opposite terminals of the source of electricity so as to connect the two elements in series, the switch being also adapted to connect either one of the terminals 33 or 34 through the terminal 32 so as to energize only one of the elements.

The shaft 20 extends through the axis of the heating unit as is clearly shown and has secured at the top thereof a spider 35, this spider having a plurality of arms 36 and a rim 37 and being rotatable with the shaft 20.

The containers 38 are cylindrical in form and have a flat bottom 39, centering means 40 being provided to center the container on the spider 35. Driving means for the container consists of a depending lug 41 formed on the bottom of the container 38, and which cooperates with one of the arms 36 of the spider 35, the container being supported on the spider and driven thereby.

The scraper consists of an arm 42 of non-circular form, and slidably disposed in a complementary socket 43 secured to the top of the housing 12, that shown in the drawings consisting of an arm of rectangular form and fitting into a rectangular aperture 44, this arm extending upwardly to a point above the top of the container and thence extending diagonally downward and terminating in a removable blade 45, which cooperates with the bottom 39 of the container 38. Removably mounted at the center of each container is a flag-staff 46 at the top of which is secured a rigid flag 47, on which is imprinted the name of the product treated by and dispensed from the machine, this flag-staff and flag rotating with the container.

The operation of the device is as follows:

The switches 35 are turned to the desired heat, high, medium, or low, and the motor 28 is cut into circuit. The motor 28 drives shaft 20 through the worm 27 and worm gear 26, driving the other shafts 20 through the sprockets 24 and chains 25. A batch of nuts is put into the containers and butter added thereto, the rotation of the containers in cooperation with the fixed scrapers, causing complete agitation and mixing of the nuts and complete coating with a very thin film of butter. After the nuts have been completely processed, the switches 35 may be turned to low heat and the nuts kept hot until such time as they are presented for sale.

It will be noted that this device forms coincidently a machine for heating nuts with or without oil or other coating material, forms a device for keeping the nuts in heated condition, and also coincidently forms an advertising and display device, the rotation of the flags 47 attracting attention to the device, and the nuts in the compartment 15 forming an attractive display.

Having described an operative device, it will be understood that variations in construction and arrangement of parts which are consistent with the appended claims may be resorted to without detracting from the spirit or scope of the invention or sacrificing any of the advantages thereof.

I claim:

1. A nut buttering machine, comprising a housing having a circular opening in its top wall, a frame in said housing, a heating element mounted upon said frame below said opening, a power-driven shaft vertically mounted centrally of said opening in bearings provided in said housing and frame, a rotatable spider concentric with and below said opening rotatable through said shaft, and a container set within said opening and supported by said spider to be rotated therewith.

2. A nut buttering machine, comprising a housing having a circular opening in its top wall, a frame in said housing, a heating element rigidly mounted upon said frame consisting of a concave heat reflector concentric with said opening, and a plurality of electrical heat-emitting wires arranged above said reflector and within the concavity thereof, a power-driven shaft disposed vertically and centrally of said opening, and a nut container disposed within said opening and rotatable through said shaft.

3. A nut buttering machine, comprising a housing having a circular opening in its top wall, a frame in said housing, a reflector mounted upon said frame concentric with said opening, a heating element disposed above said reflector, a power-driven shaft mounted vertically and centrally of said opening, a rotatable spider concentric with and below said opening rotatable through said shaft, and a container set within said opening and supported by said spider to be rotated therewith.

4. A nut buttering machine, comprising a housing having a circular opening in its top wall, a frame in said housing, a heating element consisting of a pair of electrical heat-emitting wires arranged in circular relation, electrical connections for utilizing said wires separately, in series, or in parallel circuits, a heat-reflector below said wires, a power-driven shaft arranged vertically and centrally of said opening, and a nut container disposed within said opening and rotatable through said shaft.

MICHAEL J. KOHLER.